Feb. 14, 1928.
L. C. HESTER
PLOW SUPPORT
Filed April 18, 1925
1,659,142
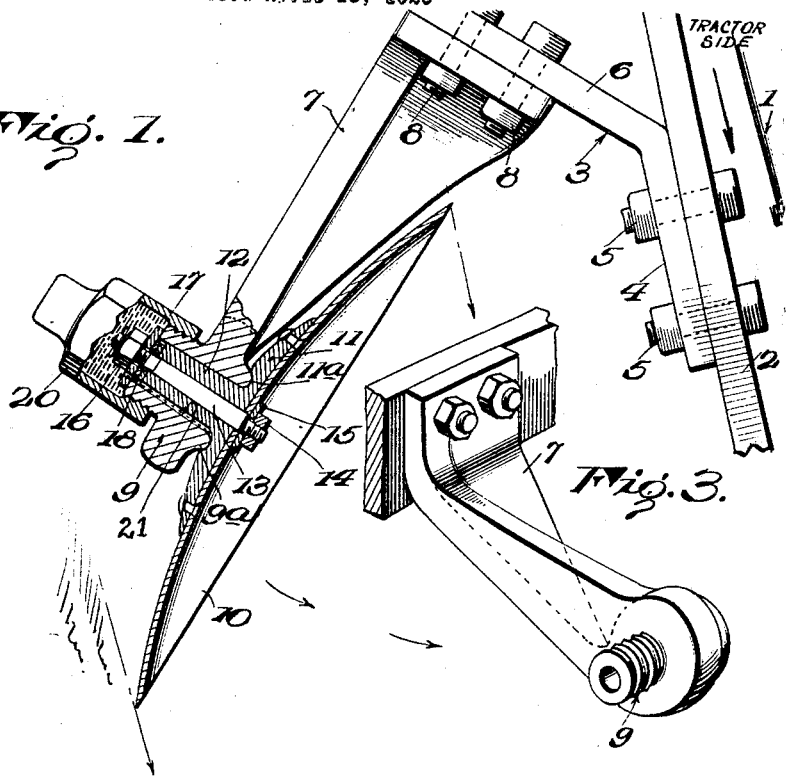
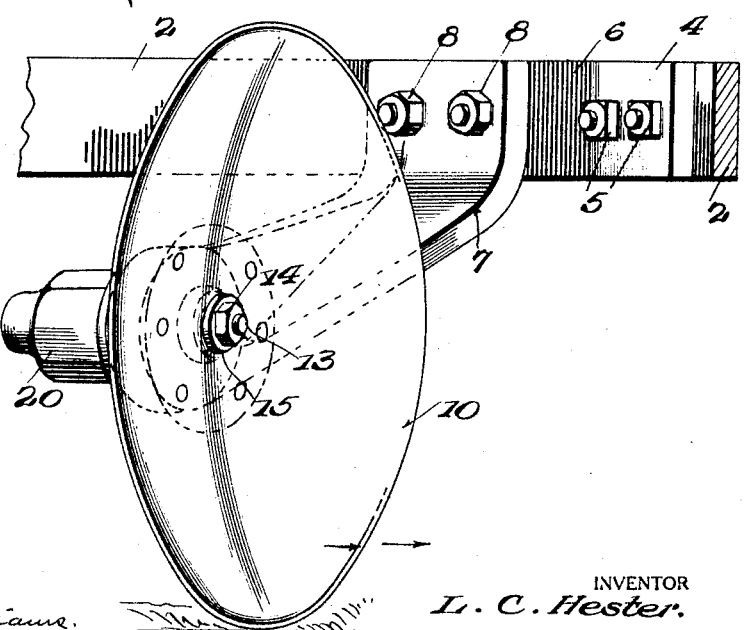
WITNESSES
W. A. Williams
INVENTOR
L. C. Hester.
BY
ATTORNEYS Patented Feb. 14, 1928.

1,659,142

UNITED STATES PATENT OFFICE.

LEVI C. HESTER, OF WILLISTON, FLORIDA.

PLOW SUPPORT.

Application filed April 18, 1925. Serial No. 24,198.

This invention relates to an improvement in plow supports or plow boxes especially adapted for use with disc plows and has for its object to provide a device of this character whereby the plow or earth working element is so related to the other structure and to the earth that it will throw or cast the earth excavated toward the wheeled support on which the plow is mounted, thereby making it possible to plow close up to trees, fences, or other objects without danger of injury to the plow or to the vehicle on which the plow is mounted.

Another object resides in the provision of a device of this character which is of simple and durable construction, reliable in operation and easy and comparatively inexpensive to manufacture.

Other objects and advantages reside in certain novel features of the construction, arrangement and combination of parts which will be hereinafter more fully described and particularly pointed out in the appended claim, reference being had to the accompanying drawings forming a part of this specification, and in which:

Figure 1 is a plan view of a plow support constructed in accordance with the present invention, parts being shown in section for the sake of illustration and a fragment of the tractor being shown in order to illustrate the relation between the plow support and the tractor, Figure 2 is a view of the plow support in side elevation, and Figure 3 is a perspective view of the arm of the plow support.

It is to be understood that the plow support forming the subject-matter of this application may be used with the arrangement shown and described and claimed in my co-pending application executed under even date with this application.

Referring to the drawings the numeral 1 designates a tractor which may be of a well known type of construction. A push bar 2 has its rear end pivotally connected with the draw bar hitch of the tractor as illustrated in my co-pending application hereinabove referred to.

A plow beam or carrier, designated generally at 3, is provided and has an attaching portion 4 secured by bolts and nuts 5 to the push bar 2. The carrier 3 also has an outwardly and rearwardly inclined portion 6 to the outer end of which one end of a reversing arm 7 is fastened by bolts and nuts 8. The reversing arm 7 curves downwardly, outwardly and forwardly and at its outer end terminates in a hub or bearing 9. A disc plow 10 is provided and to the back of the plow a flange 11 of an attaching spindle 12 is fixed. The attaching spindle 12 is rotatably fitted in the hub 9 of the arm 7 and is held against axial displacement from the hub by means of a bolt 13 embedded in the hollow spindle 12 and beyond the ends thereof. On the other end of the belt 13 a nut 14 is threaded. Between the nut 14 and the disc plow 10 a washer 15 is interposed. On the inner end of the bolt 13 a nut 16 is threaded and co-acts with a washer 17 (the latter engaging the inner end of the hub 9) to pull the hollow spindle 12 into the hub 9 to the requisite extent. The hub 9 has an annular rib $9^a$ which seats in a groove $11^a$ in the flange 11 when the bolt 16 is tightened up. In order to limit the extent to which the spindle 12 is pulled into the hub 9 shims or washers 18 are mounted on the reduced inner end of the bolt 13 between the main body of the bolt 13 and the large washer 17. The spindle 12 and the bore of the hub 9 may be slightly tapered.

A grease cup 20 is threaded onto the hub 9 and may be turned to force grease or lubricant through an oil or lubricant passage 21 in the spindle 12. With this arrangement the concaved face of the disc plow 10 is presented toward the vehicle or tractor although the plane of the disc plow is angled with respect to the tractor. From a consideration of Fig. 1 it will be seen that as the tractor moves in the direction of the arrow the cut made by the disk plow 10 results in a displacement of the earth toward the vehicle. This action enables the vehicle and plow to plow close up to trees, plants, fences and the like without danger of injury to the plow and to the vehicle.

The bolt 13 is embedded in the spindle 12 by scoring the bolt or casting the spindle around the bolt.

I claim:

A plow for use on tractors and comprising a push bar connected to the tractor, a plow carrier secured to the push bar and having a rearwardly and outwardly inclined portion, a reversing arm having one end secured to the rearwardly and outwardly inclined portion of the plow carrier, said reversing arm curving downwardly and outwardly and forwardly from the point of its attachment to the plow carrier and having a bearing at its outer end, a spindle journaled in the bearing, and a disc plow carried by the spindle and facing toward the tractor.

LEVI C. HESTER.